United States Patent
Ahirwar

(10) Patent No.: US 9,635,515 B1
(45) Date of Patent: Apr. 25, 2017

(54) APPARATUS AND METHODS FOR GENERATING AN ACCURATE ESTIMATE OF A TIME OF RECEIPT OF A PACKET

(71) Applicant: Marvell International Ltd., Hamilton (BM)

(72) Inventor: Vijay Ahirwar, Bhopal (IN)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 15/187,652

(22) Filed: Jun. 20, 2016

Related U.S. Application Data

(60) Provisional application No. 62/182,803, filed on Jun. 22, 2015.

(51) Int. Cl.
| | |
|---|---|
| *G01S 3/02* | (2006.01) |
| *H04W 4/04* | (2009.01) |
| *H04L 7/00* | (2006.01) |
| *H04W 4/00* | (2009.01) |
| *H04W 4/02* | (2009.01) |
| *H04W 8/00* | (2009.01) |

(52) U.S. Cl.
CPC ............ *H04W 4/04* (2013.01); *H04L 7/0054* (2013.01); *H04W 4/008* (2013.01); *H04W 4/023* (2013.01); *H04W 8/005* (2013.01)

(58) Field of Classification Search
CPC ....... H04W 4/04; H04W 4/008; H04W 4/023; H04W 8/005; H04L 7/0054
See application file for complete search history.

(56) References Cited

U.S. PATENT DOCUMENTS

| RE44,737 E | 1/2014 | Raykar et al. | |
|---|---|---|---|
| 8,842,571 B1 | 9/2014 | Yu et al. | |
| 9,232,493 B2 | 1/2016 | Zhang et al. | |
| 2011/0028093 A1* | 2/2011 | Patel | H04B 17/27 455/41.2 |
| 2011/0095866 A1* | 4/2011 | Karr | G06Q 10/00 340/10.1 |
| 2014/0009340 A1* | 1/2014 | Meador | G01S 5/0284 342/458 |

OTHER PUBLICATIONS

Zanchi, "Bluetooth® Low Energy—Whitepaper," LitePoint Corporation, 20 pages, (Jun. 2012).

* cited by examiner

Primary Examiner — Dac Ha

(57) ABSTRACT

A first communication device generates a plurality of samples from a sampled signal, the sampled signal corresponding to a first sampling frequency, the plurality of samples correspond to a second sampling frequency that is greater than the first sampling frequency, and the sampled signal corresponds to a data unit wirelessly transmitted from a second communication device to the first communication device. The first communication device generates a correlation signal using the plurality of samples, and uses the correlation signal to generate a time estimate of a time at which the data unit was received at the first communication device. The first communication device uses the time estimate to estimate a distance between the first communication device and the second communication device.

22 Claims, 8 Drawing Sheets

APPARATUS AND METHODS FOR GENERATING AN ACCURATE ESTIMATE OF A TIME OF RECEIPT OF A PACKET

CROSS-REFERENCES TO RELATED APPLICATIONS

This application claims the benefit of U.S. Provisional Patent Application No. 62/182,803, entitled "BLE Round Trip Time Estimation for BLE based Indoor Positioning for Legacy BLE Devices," filed on Jun. 22, 2015, the disclosure of which is incorporated herein by reference in its entirety.

FIELD OF THE DISCLOSURE

The present disclosure relates generally to Bluetooth Low Energy (BLE) devices and, more particularly, to finding round trip timing estimate for BLE devices.

BACKGROUND

Some Bluetooth devices, such as Bluetooth Low Energy (BLE) devices operating according to Bluetooth Standards, support BLE based Indoor Positioning. However, BLE-based Indoor Positioning requires BLE devices to be compliant with the BLE Indoor Positioning standard. Legacy BLE devices, however, often are not compliant with the BLE the Indoor Positioning Standard.

SUMMARY

In an embodiment, a method includes: generating, at a first communication device, a plurality of samples from a sampled signal, wherein the sampled signal corresponds to a first sampling frequency, the plurality of samples correspond to a second sampling frequency that is greater than the first sampling frequency, and the sampled signal corresponds to a data unit wirelessly transmitted from a second communication device to the first communication device. The method also includes: generating, at the first communication device, a correlation signal using the plurality of samples; using, at the first communication device, the correlation signal to generate a time estimate of a time at which the data unit was received at the first communication device; and using, at the first communication device, the time estimate to estimate a distance between the first communication device and the second communication device.

In another embodiment, an apparatus comprises: an up-sampler configured to generate a plurality of samples from a sampled signal, wherein the sampled signal corresponds to a first sampling frequency, the plurality of samples correspond to a second sampling frequency that is greater than the first sampling frequency, and the sampled signal corresponds to a data unit wirelessly transmitted from a second communication device to a first communication device. The apparatus also comprises: a correlator configured to generate a correlation signal using the plurality of samples; a timing estimator configured to use the correlation signal to generate a time estimate of a time at which the data unit was received by the first communication device; and a distance estimator configured to use the time estimate to estimate a distance between the first communication device and the second communication device.

In yet another embodiment, a method includes: processing a sampled signal with a fractional delay interpolator of a first communication device, wherein the sampled signal corresponds to a data unit wirelessly transmitted from a second communication device to the first communication device; generating, at a first communication device, a correlation signal using the sampled signal; using, at the first communication device, the correlation signal to generate an initial time estimate of a time at which the data unit was received at the first communication device; using a timing recovery loop of the first communication device to control the fractional delay interpolator; adjusting, at the first communication device, the initial time estimate based on an output of the timing recovery loop to generate an adjusted time estimate; and using, at the first communication device, the adjusted time estimate to estimate a distance between the first communication device and the second communication device.

In still another embodiment, an apparatus comprises: a fractional delay interpolator configured to process a sampled signal that corresponds to a data unit wirelessly transmitted from a second communication device to the first communication device; a timing recovery loop coupled to the fractional delay interpolator, wherein the timing recovery loop is configured to control the fractional delay interpolator; a correlator configured to generate a correlation signal using the sampled signal; a timing estimator configured to use the correlation signal to generate an initial time estimate of a time at which the data unit was received by the first communication device, and adjust the initial time estimate based on an output of the timing recovery loop to generate an adjusted time estimate. The apparatus also comprises a distance estimator configured to use the adjusted time estimate to estimate distance between the first communication device and the second communication device.

DETAILED DESCRIPTION

In embodiments described below, the distance between a first communication device and a second communication device is accurately determined by estimating a time for a communication frame (sometimes referred to herein as a "packet") to travel from the first communication device to the second communication device, which is sometimes referred to as a "time of flight". Determining the time of flight involves determining when the second communication device receives the packet, at least in some embodiments. A more accurate determination of when the packet is received by the second communication device facilitates determining a more accurate estimation of the time of flight, at least in some embodiments. A more accurate determination of the time of flight facilitates determining a more accurate estimate of the distance between the first communication device and the second communication device.

Figure 1:
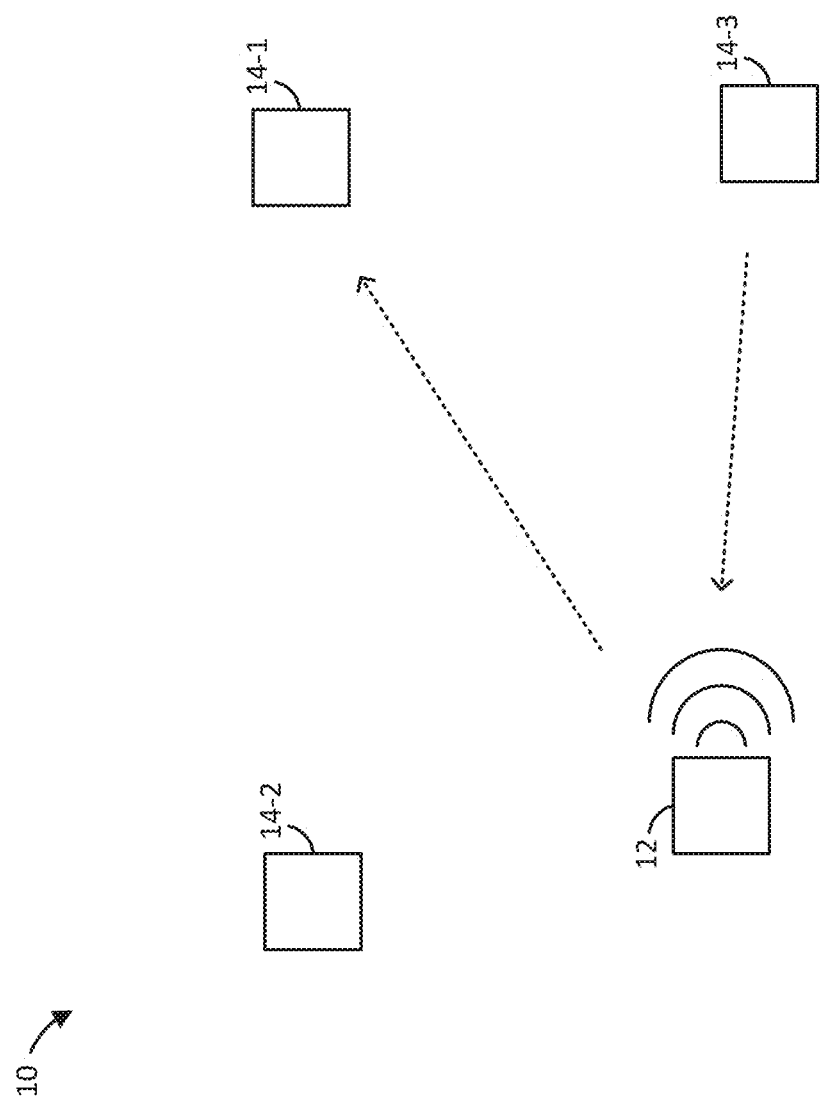
FIG. 1 is a block diagram of an example system in which distance estimation techniques described herein are implemented, according to an embodiment.

FIG. 1 is a block diagram of an example communication system 10 in which distance estimation techniques described herein are implemented, according to an embodiment. The example communication system 10 includes a communication device 12, as well as three additional communication devices 14-1 through 14-3. In an embodiment, the communication device 12 is a first communication device and the communication devices 14-1 through 14-3 are examples of second communication devices. In an embodiment, the communication device 12 wirelessly transmits a first packet to the second communication device 14-1, and records a time at which the first packet was transmitted. In response to receiving the first packet, the communication device 14-1 immediately transmits a second packet to the communication device 12. The communication device 12 detects receipt of the second packet and records a time at which the second packet was detected ("time of arrival"), according to an embodiment. The communication device 12 then then uses the recorded time of transmission of the first packet and the time of arrival of the second packet to calculate a round trip time of the first packet and the second packet, according to an embodiment. The round trip time is used to calculate a distance between the communication device 12 and the communication device 14-1, in some embodiments.

Similarly, the communication device 12 may exchange packets with communication devices 14-2 and 14-3, and calculate respective round trip times and respective distances to communication devices 14-2 and 14-3, in some embodiments. Additionally, communication devices 14 may exchange packets with one another, and calculate respective round trip times and respective distances between one another, in some embodiments. Calculated distances are then used to calculate positions of one or more of the communication devices 12, 14 using triangulation techniques, in some embodiments.

While the embodiment and scenario of FIG. 1 shows three devices 14-1 through 14-3, other embodiments and/or scenarios include more or fewer devices 14. In some embodiments, the communication device 12, and each of the communication devices 14-1 through 14-3, are configured to communicate according to a personal area network (PAN) communication protocol, such as the Bluetooth protocol or another suitable PAN communication protocol. In other embodiments, the devices 12, 14 are configured to communicate according to another suitable communication protocol such as a wireless communication protocol (e.g., a wireless local area network (WLAN) protocol, a cellular communication protocol, a satellite communication protocol, etc.) or a wired communication protocol (e.g., a wired local area network (LAN) communication protocol, a metropolitan area network (MAN) protocol, etc.)

Figure 2:
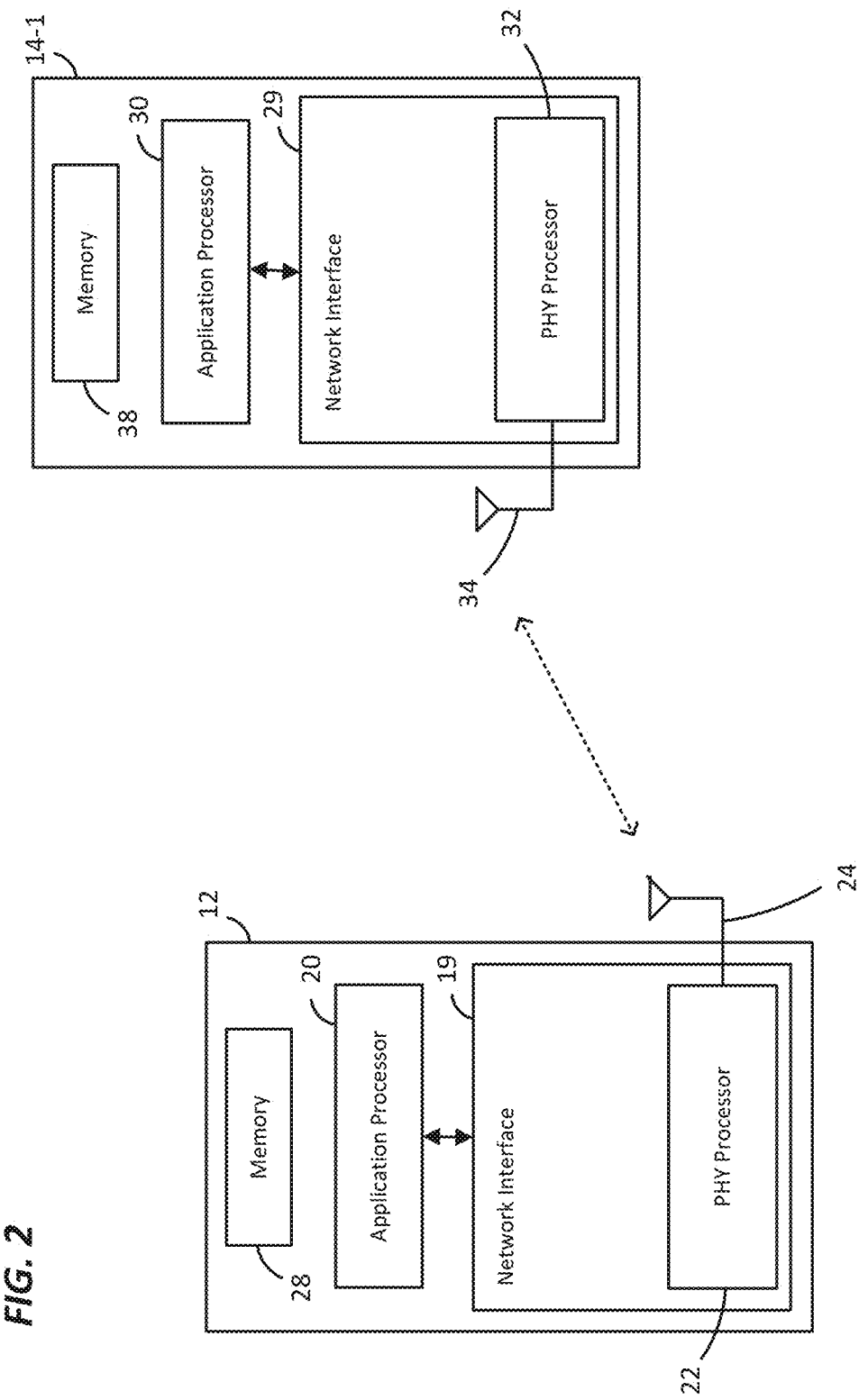
FIG. 2 is a block diagram providing additional detail of devices within the system of FIG. 1, according to an embodiment.

FIG. 2 is a diagram illustrating the communication devices 12 and 14-1 of FIG. 1 in more detail, according to an embodiment. The communication device 12 includes a network interface 19 coupled to an application processor 20. In an embodiment, the network interface 19 includes one or more integrate circuits (ICs) configured to operate as discussed below. The network interface 19 includes a physical layer (PHY) processor 22 coupled to one or more antennas 24. The PHY processor 22 is configured to implement PHY functions defined by a communication protocol, in some embodiments. The PHY processor 22 includes one or more transceivers (not shown) and logic circuitry for implementing PHY functions defined by a communication protocol. In some embodiments, the logic circuitry includes a processor configured to execute machine readable instructions stored in a memory (not shown) of, or coupled to, the network interface 19. In some embodiments, the logic circuitry includes hardwired circuitry that cannot be reconfigured. In some embodiments, the logic circuitry includes reconfigurable circuitry such as a programmable logic device (PLD), a programmable logic array (PLA), a field programmable gate array (FPGA), etc.

The communication device 12 also includes a memory 28 coupled to the application processor 20. In some embodiments, the application processor 20 is configured to execute machine readable instructions stored in the memory 28. In an embodiment, the memory 28 is a non-transitory, tangible, computer-readable memory that includes one or more volatile and/or nonvolatile memories, such as a random access memory (RAM) and/or a read-only memory (ROM), for example. In some embodiments in which the PHY processor 22 includes a processor that implements computer readable instructions, the memory 28 also stores instructions that are to be executed by the processor 22.

The PHY processor 22 is configured to perform at least PHY functions defined by the Bluetooth protocol for transmitting and receiving wireless signals via the antenna(s) 24, in an illustrative embodiment.

In some embodiments, the application processor 20 is configured to execute one or more software applications, such as an application that responds to requests to find/identify devices in a network, an application that provides a distance estimate between devices within a network, an application that estimates positions of devices within a network, etc. While FIG. 2 shows the application processor 20 separate from the network interface 19, in some embodiments the application processor 20 is a component of the network interface 19.

The device 14-1 includes a network interface 29 coupled to an application processor 30. In an embodiment, the network interface 29 includes one or more ICs configured to operate as discussed below. The network interface 29 includes a PHY processor 32 coupled to one or more antennas 34. The PHY processor 32 is similar to the PHY processor 22 and is configured similarly to the PHY processor 22, in some embodiments.

The device 14-1 also includes a memory 38. The memory is similar to the memory 28, in some embodiments.

In an embodiment, the application processor 30 is similar to the application processor 20 and is configured similarly to the application processor 20, in some embodiments.

In some embodiments, devices 14-2 and 14-3 of FIG. 1 are structured and configured the same as or similar to the device 14-1 as shown in FIG. 2.

Referring now to FIGS. 1 and 2, in an illustrative embodiment in which the devices 12, 14 are configured according to the Bluetooth Low Energy (BLE) protocol, the communication system 10 is configured to employ a data rate of 1 Mbps and a baud rate of 1 Msps. In such embodiments, the devices 12, 14 are configured to use a Gaussian frequency shift keying (GFSK) modulation technique. In an embodiment, the devices 12, 14 are also configured to use a Gaussian point spread function (PSF) when transmitting GFSK modulated data.

In embodiments in which GFSK modulation and a baud rate of 1 Msps, a receiver (such as the first communication device 12) employs a sampling rate of 8 MHz to sample a received signal. A timing estimate (corresponding to receipt of a packet such as described above) obtained using a signal sampled at 8 MHz will have a resolution of 125 ns, which results in an ambiguity of 18.75 meters in distance estimates, in some embodiments. However, obtaining a higher resolution of timing estimate is often required in order to obtain a more accurate distance estimate, at least in some embodiments. Thus, according to some embodiments discussed below, the sampling rate of the received signal is upconverted to a higher sampling rate to generate an oversampled signal, which is then processed to determine a timing estimate. For instance, in an illustrative embodiment, sampling rate conversion is performed on a received signal sampled at 8 MHz to generate an oversampled signal corresponding to a 128 MHz sampling rate, which provides a timing resolution of 7.8 ns, which in turn provides a distance estimate with an ambiguity of 1.72 meters.

Figure 3:
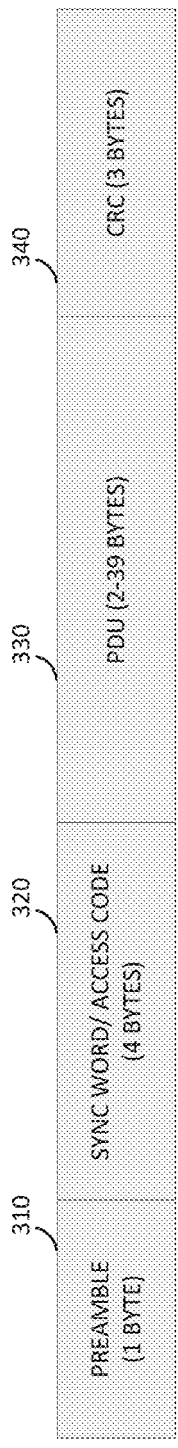
FIG. 3 is a diagram of an example data unit exchanged between devices in the example system of FIG. 1, according to an embodiment.

FIG. 3 is a diagram of an example PHY data unit 30 (sometimes referred to as "the packet 30") that is utilized by the communication devices 12, 14, according to some embodiments. In an embodiment, the packet 30 conforms to the BLE protocol. The packet 30 includes a preamble 310, a synchronization word/access code field 320, a protocol data unit (PDU) payload field 330, and a Cyclic Redundancy Check (CRC) field 340. In an embodiment, the synchronization word/access code field 320 includes a 32 bit synchronization word to assist in packet detection and synchronization. In embodiments described herein, the synchronization word is used to estimate the packet arrival time. For example, in some embodiments, a correlator is utilized to detect the synchronization word, and detection of the synchronization word (using the correlator) is in turn used to estimate a time at which the packet 30 is received. For example, in some embodiments, an output of the correlator is compared to a threshold, and when the output of the correlator exceeds the threshold, a detection signal is generated. In an embodiment, the detection signal is utilized to generate an estimate of the time at which the packet 30 was received. For example, in an embodiment, a time (e.g., measured by a clock of the receiver) at which the detection signal is generated is recorded, and the recorded time is used to estimate the time of arrival of the packet 30.

Figure 4:
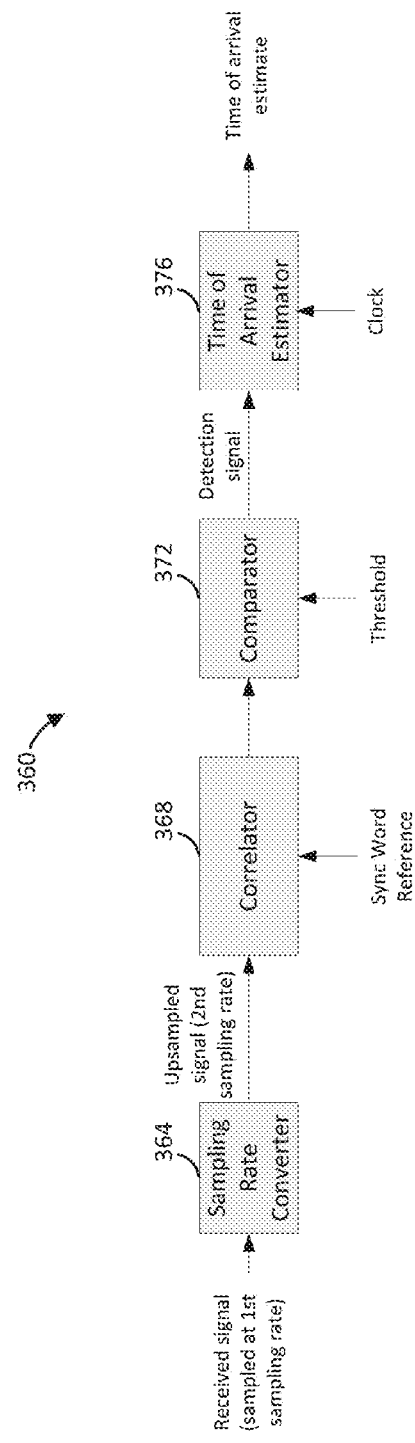
FIG. 4 is a diagram of an example system for generating an estimate of a time of arrival of a packet, according to an embodiment.

FIG. 4 is a diagram of an example circuitry 360 for generating an estimate of a time of arrival of a packet, such as the packet 30 of FIG. 3, according to an embodiment. The circuitry 360 is included in the PHY processor 22 and/or the PHY processor 32, in some embodiments.

A sampling rate converter 364 is configured to receive a signal, sampled at a first sampling rate, and process the received signal to generate an upsampled signal corresponding to a second sampling rate that is higher than the 1st sampling rate. The signal received by the sampling rate converter 364 corresponds to a communication signal received by the communication device 12 or one of the communication devices 14, in various embodiments.

A correlator 368 is coupled to the sampling rate converter 364. The correlator 368 is configured to perform a cross-correlation operation on i) the upsampled signal and ii) a synchronization word reference (e.g., the synchronization word discussed above with respect to FIG. 3, a known pattern in a PHY preamble of a packet, etc.) to generate a correlator output signal, in an embodiment. In another embodiment, the correlator 368 is configured to perform an autocorrelation operation on the upsampled signal to generate the correlator output signal. In embodiments in which the system 400 is to be used with communication devices configured to operate according to BLE, the correlator 368 includes a BLE synchronization word correlator configured to operate at 8 MHz. In prior art devices, the synchronization word correlator 368 would correlate samples B0, B8, B16 . . . B248 (1 MHz correlation) against a set of reference bits R0-R31. In some embodiments, however, the correlator 368 is run at 128 MHz and is provided interpolated inputs, as is described in more detail below. In some embodiments, in an ideal situation and when the reference signal synchronization word matches with the reference bits, the output of the correlator 368 remains high for 1 μs (e.g., 128 phases).

A comparator 372 is coupled to the correlator 368. The comparator 372 is configured to compare the correlator output to a threshold, in an embodiment. The comparator 372 is configured to generate a detection signal when the correlator output meets the threshold, in an embodiment.

A time estimate generator 376 is coupled to the comparator 372 and a clock circuit (not shown). The time estimate generator 376 is configured to determine a clock value when the detection signal is generated, in an embodiment. The time estimate generator 376 is configured to generate an estimate of a time at which the packet 30 was received based on the clock value determined to correspond with generation of the detection signal, in an embodiment.

Figure 5:
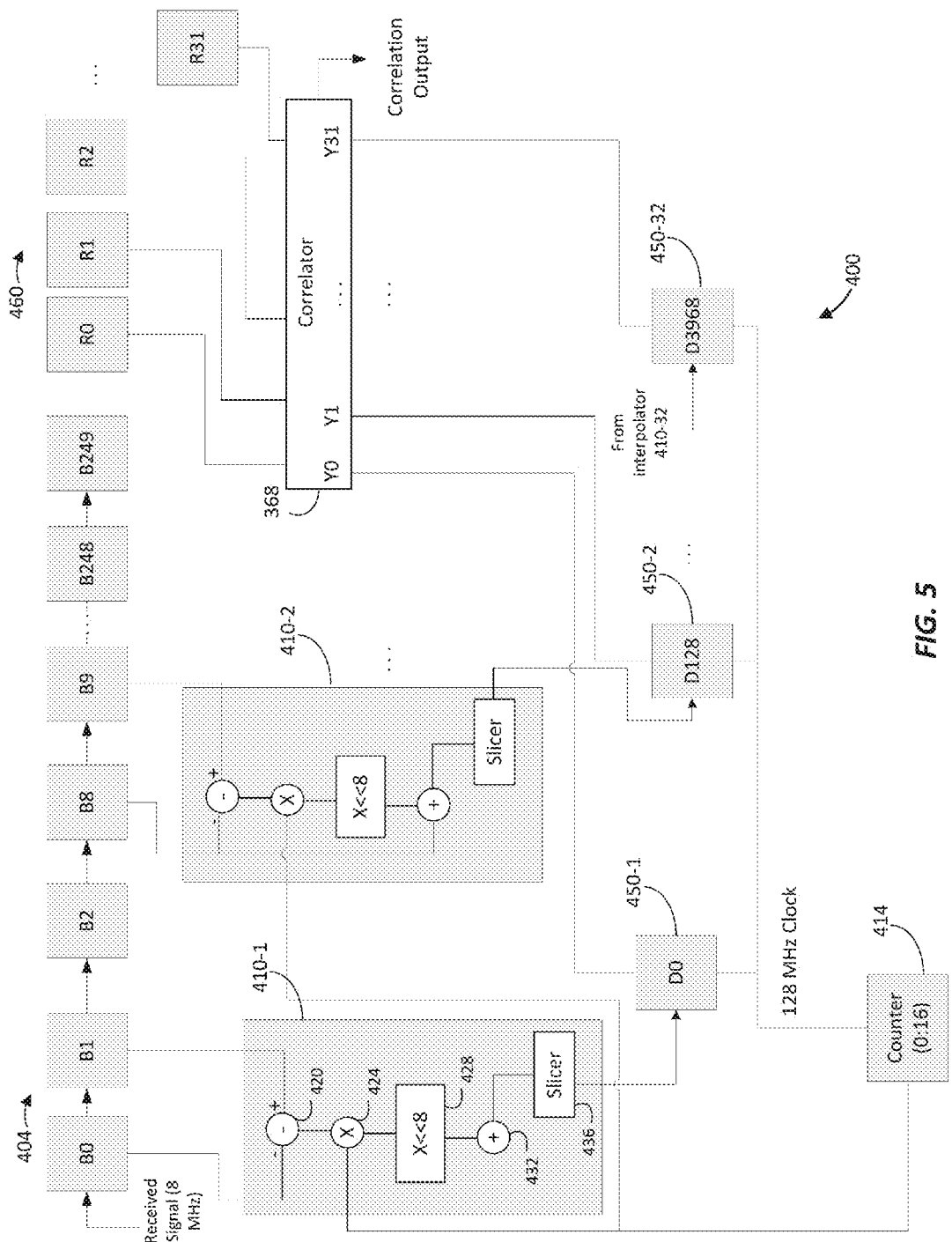
FIG. 5 is a block diagram of an example linear interpolator system implemented within a communication device of FIG. 2, according to an embodiment.

FIG. 5 is a block diagram of an example linear interpolator system 400 that is included in the sampling rate converter 364 of FIG. 4, according to an embodiment. According to an illustrative embodiment, the linear interpolator system 400 interpolates between samples of an 8 MHz signal to generate an upsampled signal corresponding to a sampling rate of 128 MHz. In an embodiment, the linear interpolator system 400 generates 15 interpolated phases between each pair of 8 MHz samples.

A plurality of memory elements 404 (B0, B1 . . . ) are coupled together in series and clocked at 8 MHz. In an embodiment, the memory elements 404 act as a shift register that is clocked at 8 MHz. The memory elements 404 store samples of the received signal.

A linear interpolator 410-1 is coupled to memory elements B0 and B1, and to a counter 414. The counter 414 is configured to count from 0 to 16, and repeat, in an embodiment. The counter 414 is clocked by a 128 MHz clock, in an embodiment.

The linear interpolator 410-1 includes a subtractor 420 that subtracts a sample in B0 from a sample in B1 to generate a difference. A multiplier 424 multiplies the difference by an output of the counter 414. A divider 428 divides an output of the multiplier by 256. In an embodiment, the divider 428 is configured to perform the division by shifting bits of the output of the multiplier 424 by 8 bits. An adder 432 adds an output of the divider 428 to the sample in B0. A slicer 436 compares an output of the adder 432 to zero. When the output of the adder 432 is greater than or equal to zero, the slicer 436 outputs +1; and when the output of the adder 432 is less than zero, the slicer 436 outputs −1, according to an embodiment. In other embodiments, another suitable slicer is utilized. In some embodiments, the slicer 436 is omitted.

A memory element 450-1 is coupled to an output of the linear interpolator 410-1, and the memory element 450-1 is clocked with the 128 MHz clock. The output of the memory element 450-1 corresponds to an upsampled signal, e.g., an upsampled version of the signal input into the plurality of memory elements 404, where the upsampled signal corresponds to a sampling rate of 128 MHz.

The linear interpolator system 400 includes 31 other linear interpolators 410-2, 410-3, . . . 410-32. Respective outputs of the linear interpolators 410 are coupled to respective memory elements 450, each clocked using the 128 MHz clock. The linear interpolator 410-2 generates interpolated values between samples in B8 and B9; the interpolator 410-3 generates interpolated values between samples in B16 and B17; and so on. For example, the interpolator 410-32 generates interpolated values between samples in B248 and B249.

Outputs of the memory elements 450 are coupled to the correlator 368. The correlator 368 performs a cross-correlation operation on i) the outputs of the memory elements 450, and ii) a reference signal stored in a plurality of memory elements 460, according to an embodiment. The correlator 368 generates an output at 128 MHz, according to an embodiment. In another embodiment, the plurality of memory elements 460 are omitted, and the correlator 368 performs an autocorrelation operation on the outputs of the memory elements 450.

In the embodiment shown in FIG. 5, the correlator 368 computes a cross-correlation of outputs of memory elements D0, D128 . . . D3968 with reference signal samples stored in memory elements R0-R31.

In one specific embodiment, in an ideal case, a high value of the correlation output is 32 (perfect match) and remains at the value 32 for 16 outputs of the correlator 368. At the times when there is no match, the correlation value remains much smaller than 32, in some embodiments. According to an embodiment, a centering process is performed when high correlation is determined. In an embodiment corresponding to a BLE synchronization word, the center sample corresponds to time 31.5 μs into the synchronization word. As 128 MHz correlation updates are used in the embodiments discussed above, the timing estimate resolution is improved to 1/128 MHz=7.8125 ns. According to an embodiment, the above timing resolution corresponds to distance error of 1.17875 meters thereby providing a more accurate position estimate as compared to correlation performed on a signal having a sampling rate of 8 MHz.

Figure 6:
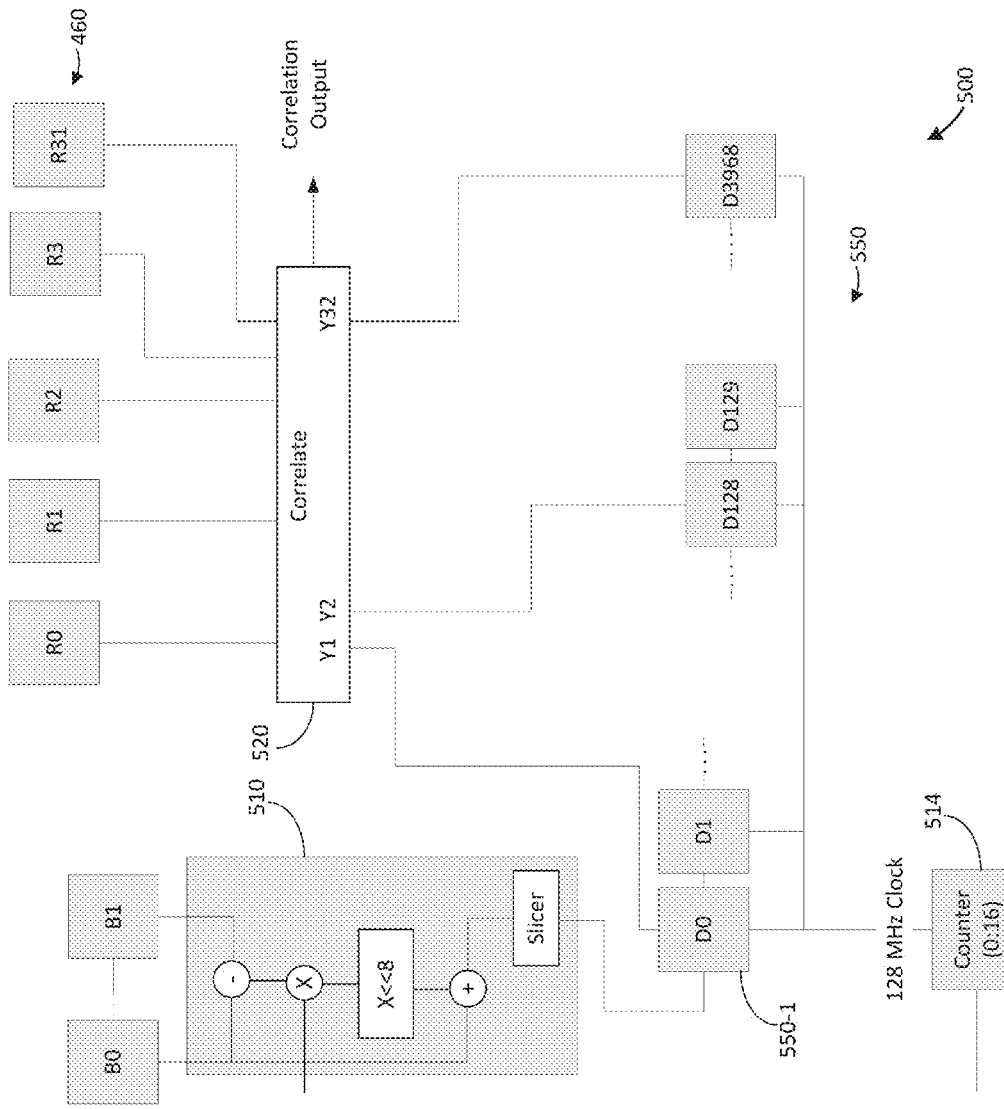
FIG. 6 is a block diagram of another example linear interpolator system implemented within a communication device of FIG. 2, according to another embodiment.

FIG. 6 is a block diagram of another example linear interpolator system 500 that is included in the sampling rate converter 364 of FIG. 4, according to another embodiment. Some elements of the example linear interpolator system 500 are the same as or similar to the system 400 of FIG. 5, and like-numbered elements are not described in detail for purposes of brevity.

According to an illustrative embodiment, the linear interpolator system 500 interpolates between samples of an 8 MHz signal to generate an upsampled signal corresponding to a sampling rate of 128 MHz. In an embodiment, the linear interpolator system 500 generates 15 interpolated phases between each pair of 8 MHz samples.

A memory element 504 (B0) and a memory element 508 (B1) are coupled together in series and clocked at 8 MHz. In an embodiment, the memory elements 504, 508 act as a shift register that is clocked at 8 MHz. The memory elements 504, 508 store samples of the received signal.

A linear interpolator 510 is coupled to memory elements B0 and B1, and to a counter 514. In an embodiment, the linear interpolator 510 is the same as or similar to the linear interpolator 410-1 of FIG. 4. In an embodiment, the counter 514 is the same as or similar to the counter 414 of FIG. 4.

A memory element 550-1 is coupled to an output of the linear interpolator 510. The memory element 550-1 is among a plurality of memory elements 550 coupled together in series and clocked with the 128 MHz clock. In an embodiment, the memory elements 550 act as a shift register that is clocked at 128 MHz. The memory elements 550 store an upsampled signal, e.g., an upsampled version of the signal input into the memory elements B0, B1, where the upsampled signal corresponds to a sampling rate of 128 MHz.

Outputs of the memory elements 550 are coupled to the correlator 368. The correlator 368 performs a cross-correlation operation on i) the outputs of the memory elements 550, and a reference signal stored in a plurality of memory elements 460, according to an embodiment. The correlator 368 generates an output at 128 MHz, according to an embodiment. In another embodiment, the plurality of memory elements 460 are omitted, and the correlator 368 performs an autocorrelation operation on the outputs of the memory elements 550.

In the embodiment shown in FIG. 5, the correlator 368 computes a cross-correlation of outputs of memory elements D0, D128 . . . D3968 with reference signal samples stored in memory elements R0-R31.

Figure 7:
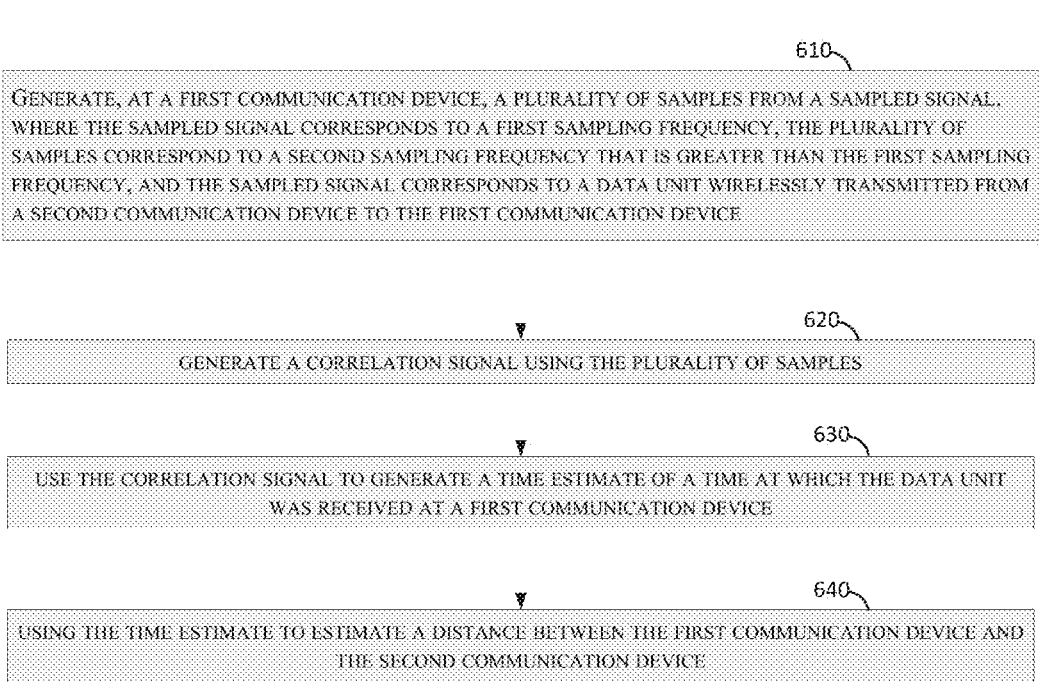
FIG. 7 is a flow diagram of an example method of estimating a distance between two communication devices, according to an embodiment.

FIG. 7 is a flow diagram of an example method 600 of estimating distance between the devices of FIG. 2, according to an embodiment. The network interface device 19 (FIG. 2) is configured to implement at least some elements of the method 600, in some embodiments. For example, the PHY processor 22 (FIG. 2) is configured to implement at least some elements of the method 600, in some embodiments. The application processor 20 (FIG. 2) is configured to implement at least some elements of the method 600, in some embodiments. The network interface device 29 (FIG. 2) is configured to implement at least some elements of the method 600, in some embodiments. As another example, the application processor 30 (FIG. 2) is configured to implement at least some elements of the method 600, in some embodiments. The method 600 is described with reference to FIGS. 1 and 2 merely for explanatory purposes. In other embodiments, the method 600 is implemented by another suitable communication device or devices.

At block 610, a plurality of samples from a sampled signal is generated at a first communication device. In an embodiment, the sampled signal corresponds to a first sampling frequency, the plurality of samples correspond to a second sampling frequency that is greater than the first sampling frequency, and the sampled signal corresponds to a data unit wirelessly transmitted from a second communication device, such as device 14-1 (FIG. 1), to the first communication device 12 (FIG. 1). In an embodiment, generating the plurality of samples comprises interpolating between different samples of the sampled signal. In some embodiments, generating the plurality of samples comprises generating at least some of the plurality of samples using a linear interpolator. In some embodiments, block 610 is implemented by an interpolator system such as described with reference to FIG. 5. In some embodiments, block 610 is implemented by an interpolator system such as described with reference to FIG. 6. In other embodiments, block 610 is implemented by another suitable interpolator system that utilizes linear interpolation.

In an embodiment, at least some samples among the plurality of samples are generated using multiple interpolators such as described with reference to FIG. 5. In some embodiments, generating the correlation signal comprises using respective outputs of the plurality of interpolators.

According to some embodiments, the method further includes shifting an output of the linear interpolator among a plurality of memory devices. In some embodiments, generating the correlation signal comprises using respective outputs of a subset of the plurality of memory devices.

At block 620, a correlation signal is generated using the plurality of samples. According to an embodiment, generating the correlation signal includes correlating samples among the plurality of samples with a predetermined signal that corresponds with a synchronization pattern in a preamble of the data unit. In some embodiments, block 620 is implemented by correlator such as the correlator described 368 described with reference to FIG. 5 and. In other embodiments, block 620 is implemented by another suitable correlator.

According to an embodiment, generating the correlation signal includes performing an autocorrelation with samples among the plurality of samples.

At block 630, a time estimate of a time at which the data unit was received at the first communication device is generated using the correlation signal. For example, in an embodiment, circuitry determines a time at which the correlation signal meets a threshold, and the time at which the correlation signal meets the threshold is used to generate the time estimate of a time at which the data unit was received at the first communication device. As another example, in an embodiment, circuitry determines when the correlation signal continuously meets a threshold for a determined number of correlation outputs. In such an embodiment, when it is determined that the correlation signal continuously meets a threshold for the determined number of correlation outputs, a centering process is performed to generate the time estimate of a time at which the data unit was received at the first communication device.

In some embodiments, block 630 is implemented by circuitry in the PHY processor 22. In some embodiments, block 630 is implemented by circuitry in the network interface device 19 that is separate from the PHY processor 22. In some embodiments, block 630 is implemented by circuitry in the PHY processor 32. In some embodiments, block 630 is implemented by circuitry in the network interface device 29 that is separate from the PHY processor 32.

At block 640, the time estimate generated at block 630 is used to estimate a distance between the first communication device and the second communication device. For example, in an embodiment, circuitry determines the estimated distance by i) using the time estimate to determine a round trip time for packets to travel between the first communication device and the second communication device, and ii) using the round trip time to determine the distance estimate. For instance, in an embodiment, the estimated distance is calculated by multiplying the round trip time by the speed of light, and then dividing the result by two. In another embodiment, the estimated distance is calculated by determining a one-way time by dividing the round trip time by two, and then multiplying the one-way time by the speed of light. In other embodiments, the estimated distance is calculated with the round trip time and the speed of light using another suitable formula.

In some embodiments, block 640 is implemented by circuitry in the PHY processor 22. In some embodiments, block 640 is implemented by circuitry in the network interface device 19 that is separate from the PHY processor 22. In some embodiments, block 640 is implemented by the application processor 20. In some embodiments, block 640 is implemented at least partially by a processor separate from the communication device 12 (e.g., by the application processor 30 or a processor of another communication device (not shown in FIGS. 1 and 2)). For example, in some embodiments, the first communication device transmits one or more of i) the time estimate determined at block 630, ii) the round trip time estimate, and iii) a one-way trip time estimate (e.g., calculated by dividing the round trip time estimate by two), to another communication device (e.g., one of the communication devices 14 or another communication device (not shown in FIGS. 1 and 2), and the other communication device uses the one or more of i) the time estimate determined at block 630, ii) the round trip time estimate, and the iii) one-way trip time estimate, to determine the distance estimate.

In some embodiments, block 630 is implemented by circuitry in the PHY processor 32. In some embodiments, block 630 is implemented by circuitry in the network interface device 29 that is separate from the PHY processor 32. In some embodiments, block 640 is implemented by the application processor 30. In some embodiments, block 640 is implemented at least partially by a processor separate from the communication device 14 (e.g., by the application processor 20 or a processor of another communication device (not shown in FIGS. 1 and 2)). For example, in some embodiments, the first communication device 14 transmits one or more of i) the time estimate determined at block 630, ii) the round trip time estimate, and the iii) one-way trip time estimate, to another communication device (e.g., the communication device 12, another one of the communication devices 14, or another communication device (not shown in FIGS. 1 and 2), and the other communication device uses the one or more of i) the time estimate determined at block 630, ii) the round trip time estimate, and the iii) one-way trip time estimate, to determine the distance estimate.

The first sampling frequency of 8 MHz and the up-sampled sampling frequency of 128 MHz are merely used as illustrative examples, and other suitable sampling frequencies are utilized in other embodiments. Timing resolution and distance resolution will tend to vary with the sampling rates that are utilized.

Figure 8:
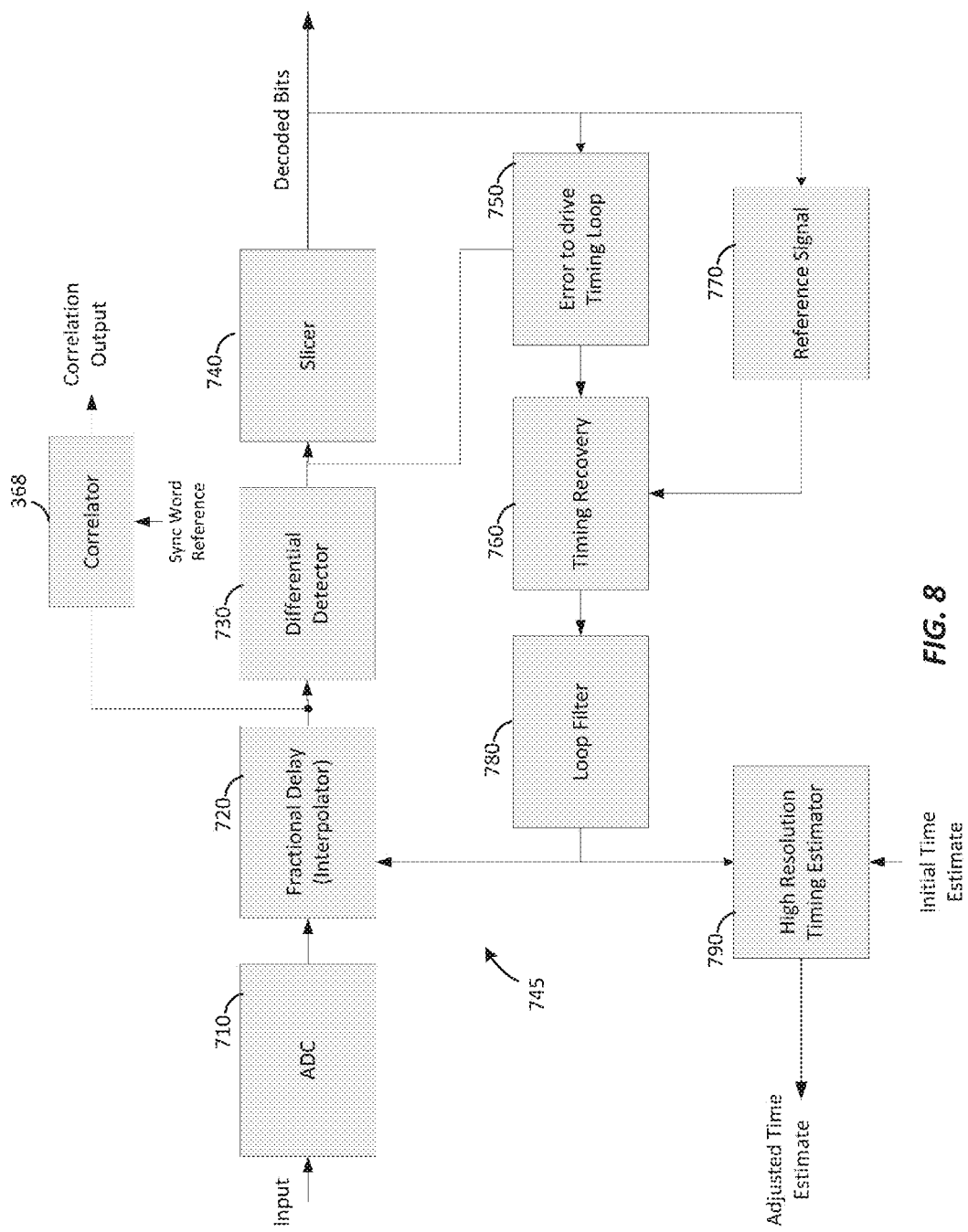
FIG. 8 is a block diagram of an example system of estimating a distance between two communication devices, according to an embodiment.

FIG. 8 is a block diagram of example receiver circuitry 700 configured to generate an estimate of a time at which a packet is received, according to another embodiment. An Analog to Digital Converter (ADC) 710 samples a received signal to generate a sampled signal. In an embodiment, the ADC 710 produces samples at 8 MHz. In other embodiments, another suitable sampling rate is utilized.

A fractional delay interpolator 720 processes the sampled signal to generate phase adjusted samples corresponding to interpolated values between successive samples in the sampled signal. A differential detector 730 multiplies the interpolated samples by a phase rotated, delayed version of the interpolated samples. A slicer 740 slices processes the phase adjusted samples to generate decoded bits having values of +1/−1

In an embodiment, an output of the fractional delay interpolator 720 is provided to the correlator 368. In an embodiment, the correlator 368 operates in a manner similar to the embodiments discussed above, except that the correlator 368 operates at the sampling rate of the ADC 710. The output of the correlator 368 is used to generate an initial time estimate in a manner similar to that discussed above, according to some embodiments, where the initial time estimate corresponds to a time at which a packet is received. In embodiments in which the system 700 is to be used with communication devices configured to operate according to BLE, the correlator 368 includes a BLE synchronization word correlator configured to operate at 8 MHz. In such embodiments, the synchronization word correlator 368 uses samples B0, B8, B16 . . . B248 (1 MHz correlation) against a set of reference bits R0-R31 (as discussed above). In some embodiments, in an ideal situation and when the reference signal synchronization word matches with the reference bits, the output of the correlator 368 remains high for 1 μs (e.g., 8 phases).

According to the embodiment, a timing recovery loop 745 is used to improve the resolution of the existing timing estimate described above. The timing recovery loop 745 includes circuitry 750 configured to determine an error signal corresponding to input to the slicer 740 as compared to an output of the slicer 740. Timing recovery circuitry 760 processes the error signal and a reference signal 770 to generate a signal indicative of a phase error between sampling instants and the received signal. In some embodiments, the timing recovery circuitry 760 is configured to perform a suitable timing recovery algorithm, such as the Mueller and Muller timing recovery algorithm, a Minimum Mean-Square Error timing recovery scheme, etc., or another suitable timing recovery algorithm or scheme.

A filter 780 filters the output of the timing recovery circuitry to generate a filtered signal indicative of a phase error between sampling instants and the received signal (timing phase signal), which is used to control the fractional delay interpolator 720.

According to an embodiment, the timing phase signal generated by the timing recovery loop 745 is used to control the fractional delay interpolator 720. As shown in FIG. 8, the timing phase signal is also fed to a high resolution timing estimator 790

In an embodiment, the initial time estimate generated using the correlator 368 is adjusted using the timing phase signal generated by the timing recovery loop. In particular, the high resolution timing estimator 790 is configured to convert the timing phase signal generated by the timing recovery loop 745 to a time error estimate in the same units as the initial time estimate, according to an embodiment. The high resolution timing estimator 790 is also configured to add the time error estimate to the initial time estimate to generate an adjusted time estimate, according to an embodiment.

According to an embodiment, adjusting the initial time estimate includes adjusting the initial time estimate based on the output of the timing recovery loop 745 it is determined that the timing recovery loop 745 has converged in connection with the data unit. In some embodiment, the timing loop 745 typically converges as the data bits in the packet are being decoded. In an embodiment, the timing loop 745 is determined to have converged once a certain portion of data bits in the packet have been decoded.

Figure 9:
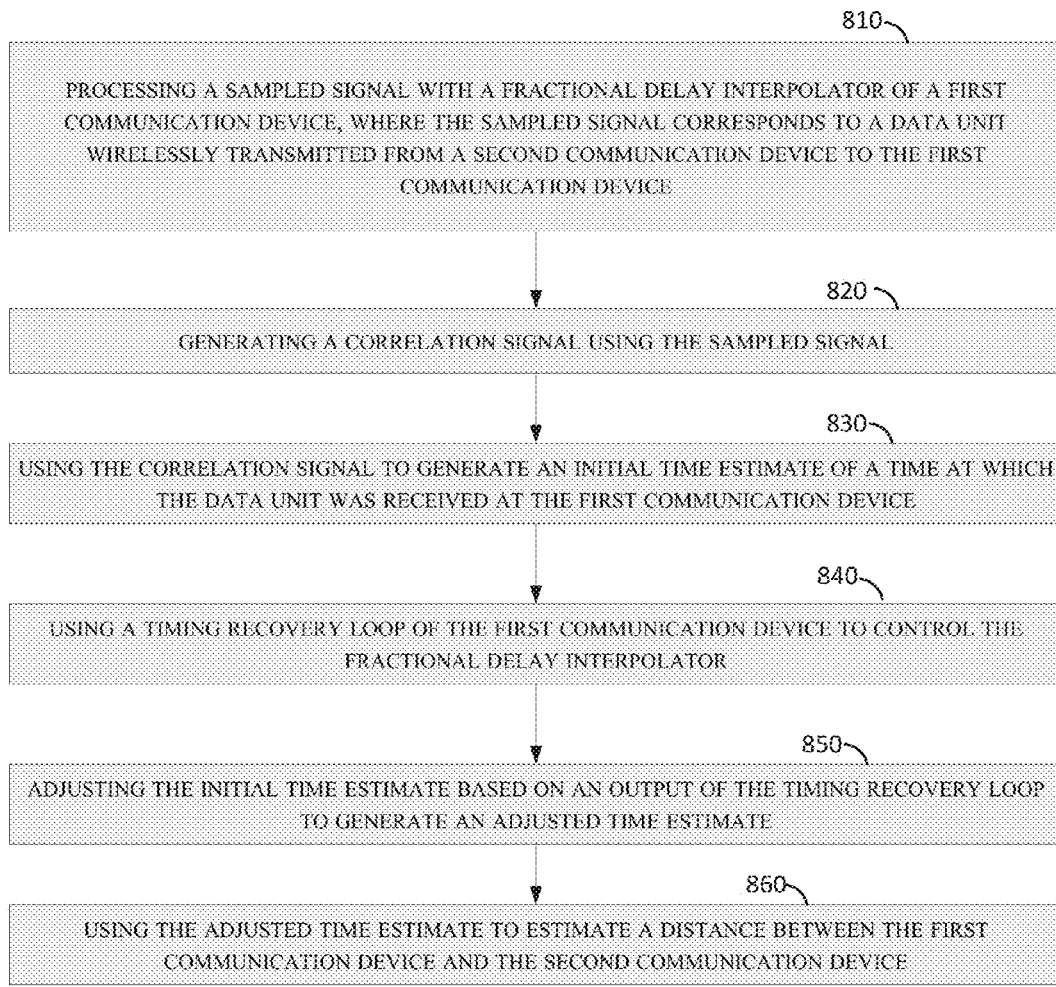
FIG. 9 is a flow diagram of an example method of estimating a distance between two communication devices, according to another embodiment.

FIG. 9 is a flow diagram of an example method 800 of estimating a distance between two communication devices, such as the devices of FIG. 2, according to an embodiment. The network interface device 19 (FIG. 2) is configured to implement at least some elements of the method 800, in some embodiments. For example, the PHY processor 22 (FIG. 2) is configured to implement at least some elements of the method 800, in some embodiments. The application processor 20 (FIG. 2) is configured to implement at least some elements of the method 800, in some embodiments. The network interface device 29 (FIG. 2) is configured to implement at least some elements of the method 800, in some embodiments. As another example, the application processor 30 (FIG. 2) is configured to implement at least some elements of the method 800, in some embodiments.

The method 800 is described with reference to FIGS. 1 and 2 merely for explanatory purposes. In other embodiments, the method 800 is implemented by another suitable communication device or devices.

The method 800 comprises processing a sampled signal with a fractional delay interpolator 720 of a first communication device (e.g., communication device 12 of FIGS. 1 and 2) at block 810. In an embodiment, the sampled signal corresponds to a data unit wirelessly transmitted from a second communication device (e.g., communication device 14-1 of FIGS. 1 and 2. At block 820, a correlation signal using the sampled signal is generated by the first communication device 12. At block 830, the first communication device uses the correlation signal to generate an initial time estimate of a time at which the data unit was received at the first communication device 12.

At block 840, a timing recovery loop of the first communication device 12 may be used to control the fractional delay interpolator 720. At block 850, the first communication device adjusts the initial time estimate based on an output of the timing recovery loop to generate an adjusted time estimate, according to the embodiment. At block 860, the first communication device 12 uses the adjusted time estimate to estimate a distance between the first communication device and the second communication device in a manner the same as or similar to that discussed above with respect to block 640 of FIG. 7.

Although time estimate generation techniques were described above in the context of determining a round trip time of flight of a packet, the time estimate generation techniques described above are also suitable for use in other contexts as well, such as determining a one-way time of flight of a packet, according to other embodiments.

Although time estimate generation techniques were described above in the context of determining a distance between communication devices, the time estimate generation techniques described above are suitable for use in other contexts as well, according to other embodiments. For example, in an embodiment, time estimate generation techniques such as described above are utilized in contexts such as using a time estimate for synchronization purposes.

At least some of the various blocks, operations, and techniques described above may be implemented utilizing hardware, one or more processors executing firmware instructions, one or more processors executing software instructions, or any combination thereof. When implemented utilizing one or more processors executing software or firmware instructions, the software or firmware instructions may be stored in any suitable tangible, non-transitory computer readable media such as on a magnetic disk, an optical disk, a magnetic tape, in a random access memory (RAM), in a read only memory (ROM), a flash memory, etc. The software or firmware instructions may include machine readable instructions that, when executed by the one or more processors, cause the one or more processors to perform various acts.

When implemented in hardware, the hardware may comprise one or more of discrete components, an integrated circuit, an application-specific integrated circuit (ASIC), a PLD, a PLA, an FPGA, etc.

While the present invention has been described with reference to specific examples, which are intended to be illustrative only and not to be limiting of the invention, changes, additions and/or deletions may be made to the disclosed embodiments without departing from the scope of the claims.

What is claimed is:

1. A method, comprising:
generating, at a first communication device, a plurality of samples from a sampled signal, wherein
the sampled signal corresponds to a first sampling frequency,
the plurality of samples correspond to a second sampling frequency that is greater than the first sampling frequency, and
the sampled signal corresponds to a data unit wirelessly transmitted from a second communication device to the first communication device;
generating, at the first communication device, a correlation signal using the plurality of samples;
using, at the first communication device, the correlation signal to generate a time estimate of a time at which the data unit was received at the first communication device; and
using, at the first communication device, the time estimate to estimate a distance between the first communication device and the second communication device.

2. The method of claim 1, wherein generating the correlation signal comprises:
correlating, at the first communication device, the plurality of samples with a predetermined signal that corresponds with a synchronization pattern in a preamble of the data unit.

3. The method of claim 1, wherein generating the plurality of samples comprises:
interpolating between different samples of the sampled signal.

4. The method of claim 3, wherein generating the plurality of samples comprises:
generating at least some of the plurality of samples using a linear interpolator.

5. The method of claim 4, further comprising:
shifting an output of the linear interpolator among a plurality of memory devices; wherein generating the correlation signal comprises using respective outputs of a subset of the plurality of memory devices.

6. The method of claim 3, wherein generating the plurality of samples comprises:
generating at least some of the plurality of samples using multiple interpolators.

7. The method of claim 6, wherein generating the correlation signal comprises using respective outputs of the plurality of interpolators.

8. An apparatus comprising:
an up-sampler configured to generate a plurality of samples from a sampled signal, wherein
the sampled signal corresponds to a first sampling frequency,
the plurality of samples correspond to a second sampling frequency that is greater than the first sampling frequency, and
the sampled signal corresponds to a data unit wirelessly transmitted from a second communication device to a first communication device;
a correlator configured to generate a correlation signal using the plurality of samples;
a timing estimator configured to use the correlation signal to generate a time estimate of a time at which the data unit was received by the first communication device; and
a distance estimator configured to use the time estimate to estimate a distance between the first communication device and the second communication device.

9. The apparatus of claim 8, wherein the correlator is configured to correlate the plurality of samples with a predetermined signal that corresponds with a synchronization pattern in a preamble of the data unit.

10. The apparatus of claim 8, wherein the up-sampler includes:
an interpolator configured to interpolate between different samples of the sampled signal.

11. The apparatus of claim 10, wherein the interpolator is a linear interpolator.

12. The apparatus of claim 10, further comprising:
a plurality of memory devices coupled in series, wherein a first memory device in the plurality of memory devices is coupled to an output of the interpolator;
wherein the correlator is coupled to respective outputs of a subset of the plurality of memory devices.

13. The apparatus of claim 8, wherein the up-sampler includes:
a plurality of interpolators configured to interpolate between different samples of the sampled signal.

14. The apparatus of claim 13, wherein the plurality of interpolators are a plurality of linear interpolators.

15. The apparatus of claim 13, wherein the correlator is coupled to respective outputs of the plurality of interpolators.

16. A method, comprising:
processing a sampled signal with a fractional delay interpolator of a first communication device, wherein the sampled signal corresponds to a data unit wirelessly transmitted from a second communication device to the first communication device;
generating, at a first communication device, a correlation signal using the sampled signal;
using, at the first communication device, the correlation signal to generate an initial time estimate of a time at which the data unit was received at the first communication device;
using a timing recovery loop of the first communication device to control the fractional delay interpolator;
adjusting, at the first communication device, the initial time estimate based on an output of the timing recovery loop to generate an adjusted time estimate; and
using, at the first communication device, the adjusted time estimate to estimate a distance between the first communication device and the second communication device.

17. The method of claim 16, wherein:
using the timing recovery loop to control the fractional delay interpolator comprises using a timing phase generated by the timing recovery loop to control the fractional delay interpolator; and
adjusting the initial time estimate includes
converting, at the first communication device, the timing phase to a time error estimate, and
adjusting the initial time estimate with the time error estimate.

18. The method of claim 16, further comprising:
determining, at the first communication device, when the timing recovery loop has converged in connection with the data unit;
wherein adjusting the initial time estimate includes adjusting the initial time estimate based on the output of the timing recovery loop when the first communication device determines that the timing recovery loop has converged in connection with the data unit.

19. An apparatus comprising:
a fractional delay interpolator configured to process a sampled signal that corresponds to a data unit wirelessly transmitted from a second communication device to the first communication device;
a timing recovery loop coupled to the fractional delay interpolator, wherein the timing recovery loop is configured to control the fractional delay interpolator;
a correlator configured to generate a correlation signal using the sampled signal;
a timing estimator configured to
use the correlation signal to generate an initial time estimate of a time at which the data unit was received by the first communication device, and
adjust the initial time estimate based on an output of the timing recovery loop to generate an adjusted time estimate; and
a distance estimator configured to use the adjusted time estimate to estimate distance between the first communication device and the second communication device.

20. The apparatus according to claim 19, wherein:
the timing recovery loop is configured to
generate a timing phase, and
use the timing phase to control the fractional delay interpolator;
the timing estimator is configured to
convert the timing phase to a time error estimate, and
adjust the initial timing estimate with the time error estimate.

21. The method of claim 19, wherein the timing estimator is configured to:
determine when the timing recovery loop has converged in connection with the data unit; and
adjust the initial timing estimate based on the output of the timing recovery loop when the timing estimator determines that the timing recovery loop has converged in connection with the data unit.

22. The apparatus according to claim 19, further comprising:
an analog-to-digital converter configured to generate the sampled signal.

* * * * *